United States Patent
Raab

[19]

[11] Patent Number: 5,517,305
[45] Date of Patent: May 14, 1996

[54] BRILLOUIN RING LASER GYRO

[75] Inventor: Michael Raab, Salem, Germany

[73] Assignee: Bodenseewerk Gerätetechnik GmbH, Überlingen, Germany

[21] Appl. No.: 396,033

[22] Filed: Feb. 28, 1995

[30] Foreign Application Priority Data

Mar. 5, 1994 [DE] Germany ............... 44 07 348.8

[51] Int. Cl.$^6$ ................................ G01C 19/68
[52] U.S. Cl. ................................ 356/350
[58] Field of Search ................................ 356/350

[56] References Cited

FOREIGN PATENT DOCUMENTS

| 104942A2 | 4/1984 | European Pat. Off. . |
| 240949A2 | 10/1987 | European Pat. Off. . |
| 393987A2 | 10/1990 | European Pat. Off. . |
| 516332A2 | 5/1991 | European Pat. Off. . |
| 2720256 | 11/1977 | Germany . |
| 4218905A1 | 12/1993 | Germany . |

OTHER PUBLICATIONS

"Stimulated Brillouin Fiber–Optic Laser Gyroscope", F. Zarinetchi et al., Feb. 15, 1991, vol. 16, No. 4, pp. 228–231, Optics Letters.

"Narrow–Linewidth Stimulated Brilluoin Fiber Laser and Applications", S. P. Smith et al., Mar. 15, 1991, vol. 16 No. 6, Optics Letters, pp. 393–395.

"Possibility of Using An Optical Fiber Brillouin Ring Laser for Inertial Sensing", P. J. Thomas et al., Applied Optics, vol. 19, No. 12, Jun. 15, 1980.

Primary Examiner—Vincent P. McGraw
Attorney, Agent, or Firm—Lowe, Price, LeBlanc & Becker

[57] ABSTRACT

A Brillouin ring laser gyro has a fiber ring resonator, which exhibits a sequence of resonance frequencies, neighboring resonance frequencies differ by a free spectral range. Two pump laser waves of opposite directions are generated. The frequency difference of these pump laser waves is an integral multiple of the free spectral range of the fiber ring resonator. The frequencies of the pump laser waves coincide with resonance frequencies of the fiber ring resonator. Due to stimulated Brillouin scattering, two Brillouin ring lasers having opposite directions of propagation are excited. Frequency fluctuations occur with such two-color ring laser gyros. The invention is based on the discovery of the causes of such frequency fluctuations and, consequently, provides means for the damping of feedback components of the laser light originating outside the fiber ring resonator. Various examples of such means are disclosed.

10 Claims, 5 Drawing Sheets

BRILLOUIN RING LASER GYRO

BACKGROUND OF THE INVENTION

The invention relates to Brillouin ring laser gyro.

More particularly, the invention relates to a Brillouin ring laser gyro of the type comprising a fiber ring resonator, which has a sequence of resonance frequencies, neighboring resonance frequencies differring by a "free spectral range" and means for generating two pump laser waves propagating in said fiber ring resonator in opposite directions, the frequencies of said pump laser waves coinciding with resonance frequencies of said fiber ring resonator and differing by an integral multiple of said free spectral range, whereby two opposite-direction Brillouin ring lasers of different frequencies are excited in said fiber ring resonator (18) by stimulated Brillouin scattering.

A ring laser gyro makes use of the Sagnac effect to measure angular rates relative to inertial space. Clockwise and counter-clockwise propagating laser waves are generated in a ring resonator. The frequency of the generated laser waves depends on the resonance frequency and thus on the optical path length of one passage of the ring resonator. If such a ring resonator is rotated relative to inertial space about an axis normal to its plane, the optical path lengths for the clockwise and counter-clockwise waves become different due to the Sagnac effect. Correspondingly, also the frequencies of the "clockwise" ring laser and of the "counter-clockwise" ring laser become different. If the laser waves propagating clockwise and the laser waves propagating counter-clockwise are superposed, a beat frequency will result, which is proportional to the angular rate. Typical ring laser gyros are He-Ne-gas laser with a helium-neon gas mixture as laser medium and with a triangular ring resonator defined by mirrors. Such ring laser gyros exhibit a "lock-in" in the range of small angular rates. In this case, due to back-scattering of light of the "clockwise" ring laser into the "counter-clockwise" ring laser and vice versa, both lasers end up in operating at a common frequency. There is no beat frequency proportional to angular rate (Frederick Aronowitz "The Laser Gyro").

Brillouin ring laser gyros are known. With such ring laser gyros, the ring resonator consists of a fiber ring. Light from a pump laser with sufficient energy is coupled into this fiber ring resonator once clockwise and once counter-clockwise. Acoustic waves are stimulated in the fiber ring resonator by these pump laser waves. These acoustic waves cause a corresponding stimulated Brillouin scattering once clockwise and once counter-clockwise. Thus two Brillouin lasers are obtained, of which one provides laser waves propagating clockwise in the fiber ring resonator and the other one providing laser waves propagating counter-clockwise in the fiber ring resonator. The frequencies of the stimulated Brillouin radiation in these Brillouin lasers are lower than the frequencies of the pump laser waves. They are also tuned to one resonance frequency of the fiber ring resonator. If there is an angular rate, also these resonance frequencies are shifted, whereby, also here, a beat frequency proportional to the angular rate is generated ("Applied Optics" Vol. 19 (1980), 1906–1908; "Optics Letters" Vol. 16 (1991), 229–231).

Also with such Brillouin ring lasers, there will be the insensivity due to "lock-in" in the range of small angular rates, as described above with reference to ring laser gyros.

It is known, in order to avoid the "lock-in", to operate the two Brillouin ring laser of the Brillouin ring laser gyro in two different modes, i.e. at two different resonance frequencies of the fiber ring resonator ("Optics Letter", Vol. 16 (1991), 230).

It is also known to excite the "clockwise" ring laser and the counter-clockwise ring laser of a Brillouin ring laser gyro with different pump lasers ("Optics Letter" Vol.16 (1991), 393–395). From this publication, an arrangement is also known, wherein pump laser supply fibers for the two pump lasers are formed by two ends of one single fiber. The fiber extends from one pump laser to the other one. In a median portion of the fiber, the fiber is coupled with the fiber ring resonator. In order to superpose the laser light beams from the oppositely directed Brillouin ring lasers, a separate waveguide network with a superposition directional coupler is provided, which is branched-off by couplers from the pump laser supply fibers.

By using two Brillouin ring lasers with substantially different frequencies (two-color ring laser gyros), influencing of one of the Brillouin ring lasers by the other one, and thereby "lock-in", is avoided. However also with two-color ring laser gyros, there are frequency fluctuations of the Brillouin ring lasers, which will deteriorate the measuring accuracy and inhibit the measurement of small angular rates such as of the angular rate of the earth.

EP 0 393 987 A2 discloses a ring resonator fiber optic gyro with a single detector on which the clockwise and counterclockwise beams interfere on leaving the beam. An angular rate causes a phase shift of the clockwise and counterclockwise beams and a corresponding interference signal at the detector. The output of the detector is used by a first and a second servo loop to compensate for optical path length changes and for rotation of the gyro, respectively. Both beams have the same frequency. There is no beat frequency. An optical isolator in front of the laser prevent the laser from being affected by the coupled-out resonator beams. EP 0 393 987 A2 shows no Brillouin ring laser.

EP 0 240 949 A2 shows a passive ring resonator angular rate sensor, wherein a pair of beams from a laser is injected clockwise and counter-clockwise, respectively, into a passive resonator. There are complex control loops to compensate for the change of optical path lengths, when an angular rate is experienced. These control loops provide a measure of this angular rate. Also EP 0 240 939 A2 does not show any Brillouin ring laser.

EP 0 516 332 A2 shows an electrically tunable fiber ring laser. This ring laser contains a resonance cavity in the form of a fiber ring. This resonance cavity contains a laser medium in the form of an erbium-doped fiber amplifier, which introduces optical gain into the fiber ring. The erbium-doped fiber amplifier is pumped by a pump laser in the form of a laser diode through a fiber and a coupler. The frequency of this laser can be tuned by a fiber Fabry-Perot. Principally, this is a classical ring laser gyroscope.

German patent application 27 20 256 discloses a method of measuring an inertial angular rate comprising the steps of providing, by means of two lasers, two monochromatic beams, which propagate in opposite directions in a passive ring resonator and of determining the frequency shifts of each of these two beams.

German patent application 42 18 905 describes a Brillouin ring laser with a fiber ring resonator. A pump laser generates cw and ccw acoustic waves in the fiber ring resonator. The cw and ccw Brillouin lightwaves generated in the fiber ring resonator are superposed at two detectors through a six-port coupler to cause interferences. Directional signals can be derived from the two detector signals by a direction detecting circuit.

EP 0 104 942 A2 shows a Brillouin ring laser with a fiber resonator formed from a loop of fiber optic material and a fiber optic directional coupler for optically closing the loop. An optical isolator consisting of a polarizer and a quarter-wave plate is arranged in front of the laser. This optical isolator serves to prevent reflected light from entering the laser and interfering with its operation. A cw and a ccw ring laser is provided in the fiber ring resonator due to Brillouin scattering. The laser frequencies depend on the optical path lengths of the fiber ring resonator. If the fiber ring resonator is subjected to angular rate, there will be a beat frequency of the two laser frequencies. This beat frequency is effective at a detector and provides a measure of the angular rate.

SUMMARY OF THE INVENTION

It is the object of the invention to improve the resolution of a Brillouin ring laser gyro.

It is a more specific object of the invention to provide a ring laser gyro which has high resolution and does not exhibit "lock-in" at small angular rates.

A still more specific object of the invention is to avoid frequency fluctuations in a Brillouin ring laser gyro of the type comprising a fiber ring resonator, which has a sequence of resonance frequencies, neighboring resonance frequencies differing by a free spectral range, and means for generating two pump laser waves propagating in said fiber ring resonator in opposite directions, the frequencies of said pump laser waves coinciding with resonance frequencies of said fiber ring resonator and differring by an integral multiple of said free spectral range, whereby two opposite-direction Brillouin ring lasers of different frequencies are excited in said fiber ring resonator by stimulated Brillouin scattering.

According to the invention, these objects are achieved by means for damping feedback components of waves originating outside said fiber ring resonator and fed back into said fiber ring resonator.

The invention is based on the discovery that the frequency fluctuations of Brillouin ring lasers are caused, in the case of a Brillouin ring laser gyro of the present type, by the fact that part of the light coupled out of the Brillouin ring laser is returned towards the fiber ring resonator and is coupled into the fiber ring resonator. If such "feedback components" of origin outside the fiber ring resonator are damped by purposeful measures, the frequency fluctuations are reduced thereby. Thereby, the resolution of the Brillouin ring laser gyro is improved considerably.

Damping of the feedback components originating outside the fiber ring resonator can be effected in various ways, as will become apparent from the following description of preferred embodiments.

Embodiments of the invention are described in greater detail hereinbelow with reference to the accompanying drawings.

DESCRIPTION OF PREFERRED EMBODIMENTS OF THE INVENTION

Figure 1:
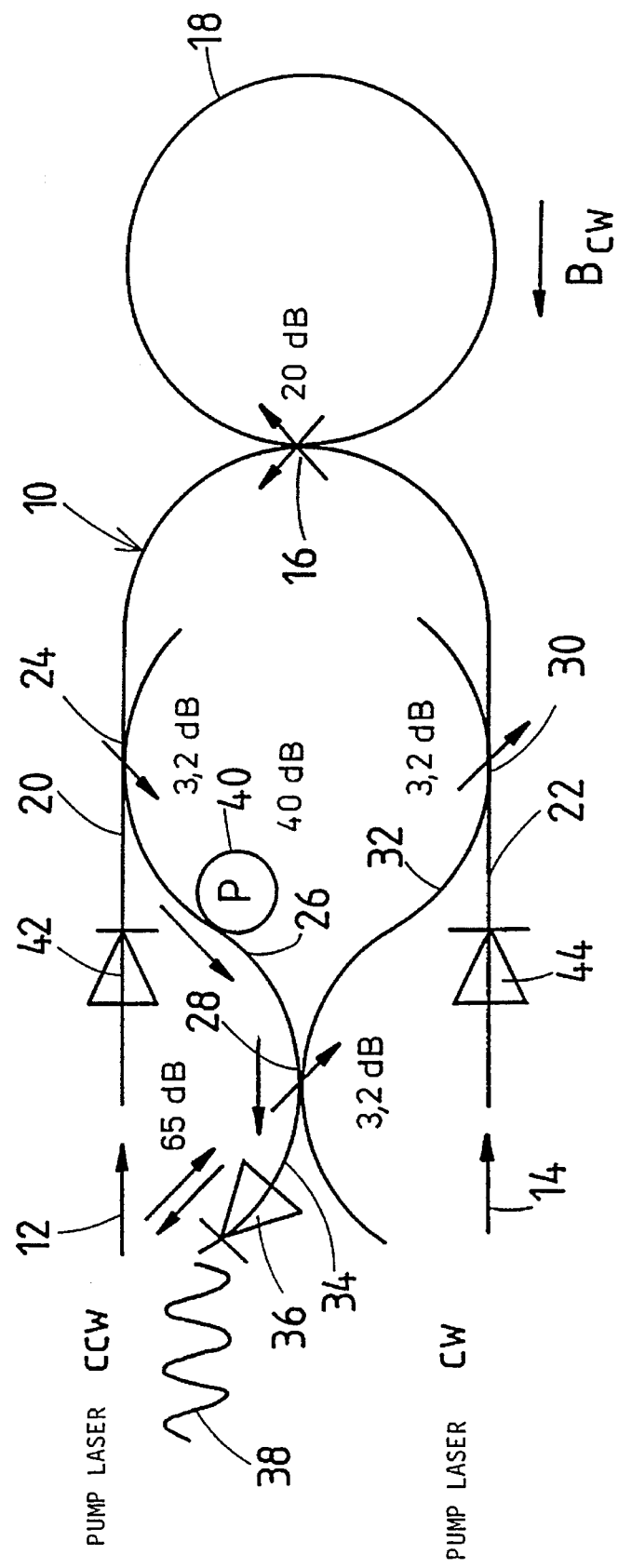
FIG. 1 schematically illustrates a Brillouin ring laser gyro wherein, in order to damp feedback components originating outside the fiber ring resonator, optical isolators are provided in the pump laser supply fibers, and a phase modulator for a carrier-suppressed sideband modulation is provided in one of the supply fibers of a superposition directional coupler.

FIG. 1 illustrates a Brillouin ring laser gyro of the present type wherein said means for generating two pump laser waves propagating in said fiber ring resonator in opposite directions comprise two pump lasers and means for coupling pump laser waves into said fiber ring resonator, said means for coupling pump laser waves into said fiber ring resonator comprising pump laser supply fibers arranged to receive and guide said pump laser waves in forward directions and coupler means for coupling said supply fibers and said fiber ring resonator, and a separate wave guide network including a superposition directional coupler with two directional coupler supply fibers, said directional coupler supply fibers being coupled, through branching means, with said pump laser supply fibers for superposing laser light beams from the Brillouin ring laser waves propagating in said fiber ring resonator in opposite directions, said laser light beams being coupled out into said pump laser supply fibers through said coupler means and propagating in said pump laser supply fibers in return directions opposite said forward directions.

Said wave guide network for superposing said coupled-out laser light beams comprises a phase modulator in exactly one directional coupler supply fiber of said superposition directional coupler, said phase modulator being modulated to provide phase modulation with suppressed carrier and high back-flux damping in the direction towards the fiber ring resonator.

Means for minimizing the proportion of the Brillouin ring laser light coupled back from the pump laser supply fibers comprise optical isolators arranged in said pump laser supply fibers having high transmission and low-transmission directions, the high transmission directions being towards said fiber ring resonator said optical isolators having high back-flux damping in their low-transmission directions.

Referring now specifically to FIG. 1, numeral 10 designates a fiber, which extends from a first pump laser 12 to a second pump laser 14. Each of the pump lasers is represented by an arrow. In its median portion, the fiber 10 is coupled with a fiber ring resonator 18 through a coupler 16. The section of the fiber 10 between the first pump laser 12 and the coupler 16 forms a first pump laser supply fiber 20. The section of the fiber 10 between the second pump laser 14 and the coupler 16 forms a second pump laser supply fiber 22. The pump lasers 12 and 14 generate pump laser waves. The pump laser wave from the pump laser 12 is coupled ccw into the fiber ring resonator 18 by the coupler 16. The pump laser wave from the pump laser 14 is coupled cw into the fiber ring resonator 18 by the coupler 16. The fiber ring resonator 18 has a series of resonance frequencies. Neighboring resonance frequencies are separated by a free spectral range. The two pump lasers 12 and 14 emit pump laser waves having different frequencies. The frequencies of the two pump laser waves are controlled by control means to coincide with different resonance frequencies of the fiber ring resonator 18. Such control means are well known to a person skilled in the art and, therefore, are not shown and described here. The difference of the frequencies of the pump laser waves are an integral multiple of the free spectral range of the fiber ring resonator 18.

The pump laser waves stimulate acoustic waves in the fiber ring resonator 18. The cw pump laser wave from pump laser 14 causes a correspondingly cw propagating acoustic wave. The ccw pump laser wave from pump laser 12 causes a correspondingly ccw acoustic wave. These acoustic waves, in turn, result in stimulated Brillouin scattering. The stimulated Brillouin scattering excites two ring lasers of opposite directions: The cw propagating acoustic wave results in ccw propagating Brillouin scattering radiation and correspondingly in a ccw ring laser, i.e. a ring laser in which the laser waves propagate ccw in the fiber ring resonator 18. The ccw propagating acoustic wave results in cw propagating Brillouin scattering radiation and correspondingly in a cw ring laser, i.e a ring laser in which the laser waves propagate cw in the fiber ring resonator 18. The frequency of the Brillouin scattering radiation is shifted relative to the frequency of the pump laser waves toward the long wavelength range, i.e. towards lower frequencies. The Brillouin scattering radiation exhibits a relatively wide frequency spectrum or band as compared to the resonance peaks of the fiber ring resonator. This frequency spectrum or band again includes a resonance frequency of the fiber ring resonator. The frequency of the ring laser will tune-in to this resonance frequency. The frequencies of the two ring lasers are substantially different. Thereby mutual influencing of the ring lasers, and therefore "lock-in", is prevented.

Parts of the laser waves of the two ring lasers are coupled out by coupler 16. Part of the cw propagating laser waves is coupled into the pump laser supply fiber 20 and propagates therein from the right to the left, as viewed in FIG. 1. Part of the ccw propagating laser waves is coupled into the pump laser supply fiber 22 and propagates therein also from the right to the left, as viewed in FIG. 1. Of the laser wave from the cw propagating ring laser propagating from the right to the left in the pump laser supply fiber 20, in turn, part is coupled out by a coupler 24 and is directed to a supply fiber 26 leading to a superposition directional coupler 28. Correspondingly, of the laser wave from the ccw propagating ring laser propagating from the right to the left in the pump laser supply fiber 22, in turn, part is coupled out by a coupler 30 and is directed to a supply fiber 32 also leading to a superposition directional coupler 28.

The end 34 of the directional coupler supply fiber 26 beyond the superposition directional coupler 28 is guided to a photodiode or some other type of photoelectric detector 36. The detector 36 provides a beat frequency of the two laser frequencies. This is indicated by a wavetrain 38.

If the Brillouin ring laser gyro is subjected to an angular rate about an axis normal to the plane of the fiber ring resonator 18, the optical path lengths of the fiber ring resonator 18 for the cw and the ccw propagating radiations vary in opposite directions. Correspondingly, also the resonance frequencies and the frequencies of the two ring lasers vary. This results in a corresponding change of the beat frequency at the detector 36. This change provides a measure of the angular rate.

With such Brillouin ring lasers, frequency fluctuations occur in spite of the de-coupling of the two ring lasers. These fluctuations are due to feedback components originating outside the fiber ring resonator 18, i.e. stray light from the cw laser or the ccw laser which is scattered outside the fiber ring resonator 18 and is returned into the fiber ring resonator 18, whereby it influences the respective laser by feedback. Various measures are taken in the embodiment of FIG. 1 to damp such feedback components:

A phase modulator 40 is interposed in the directional coupler supply fiber 26 leading to the superposition directional coupler (sdc) 28. No such phase modulator is provided in the other directional coupler supply fiber 32, which leads from the coupler 30 to the sdc 28. The phase modulator 40 causes phase modulation with suppressed carrier and high back-flux damping in the direction of the fiber ring resonator 18.

The phase modulator 40 includes a section of the fiber of the directional coupler supply fiber 26, which is wound on the peripheral surface of a piezo-ceramic ring. The piezo-ceramic ring is energized electrically by a sinusoidal signal and is expanded correspondingly. This expansion of the fiber causes periodic variation of the optical wavelength and, thereby, a phase modulation. The frequency and the amplitude of the path length variation is selected to provide a modulation index of just 2.305. This is the first zero of the zero-order Bessel function. The laser wave coupled out from the cw ring laser into the pump laser supply fiber 20 by the coupler 16 and, further, coupled out from the pump laser supply fiber 20 into the directional coupler supply fiber 26 by the coupler 24 is then carrier-suppressed sideband-modulated.: Behind the phase modulator 40, only the sidebands obtained by the phase modulation appear but no longer the frequency of the laser wave itself. If this light is back-scattered, for example, at the transition to the detector 36, this back-scattered light cannot affect the frequency of the cw propagating laser, even if it partly gets into the fiber ring resonator 18 through the directional coupler supply fiber 32 and the couplers 30 and 16. This is true, at any rate, if the modulation frequency is sufficiently high. Typically, modulation frequencies of some kilocycles per second are sufficient for this purpose. The same is valid for the laser wave which is coupled-out from the ccw propagating laser into the pump laser supply fiber 22 by the coupler 16 and is directed to the directional coupler supply fiber 32 by the coupler 30. Reflected or back-scattered feedback components of this light have to be guided back through the directional coupler supply fiber 26, coupler 24, pump laser supply fiber 20 and coupler 16 into the fiber ring resonator 18, if they are to be injected into the fiber ring resonator 18 ccw, as viewed in FIG. 1. Then the feedback components have, however, to pass also through the phase modulator 40. Thus also these feedback components are pushed into the sidebands, which do not affect the ccw propagating laser. By this measure, the de-coupling of the superposition directional coupler and the detector from the laser is improved by three to six orders of magnitude, depending on the quality of the phase modulator 40.

A further measure for damping the feedback components originating outside the fiber ring resonator in the Brillouin ring laser gyro of FIG. 1 consists in arranging optical isolators or optical "diodes" 42 and 44 in the pump laser supply fibers between the pump lasers 12 and 14, respectively and the couplers 24 and 30, respectively. The optical isolators 42 and 44 must have high back-flux damping of, for example, 65 dB. Instead or in addition, measures can be taken to improve the fiber coupling arrangement for coupling the pump laser waves from the pump lasers 12 and 14 into the pump laser supply fibers 20 and 22, respectively. Thereby, reflexions of the ring laser waves at theses coupling arrangements are minimized Thus, in this case, the means for minimizing the proportion of the Brillouin ring laser light coupled back from the pump laser supply fibers 20,22 comprises means for minimizing back-scattering.

Figure 2:
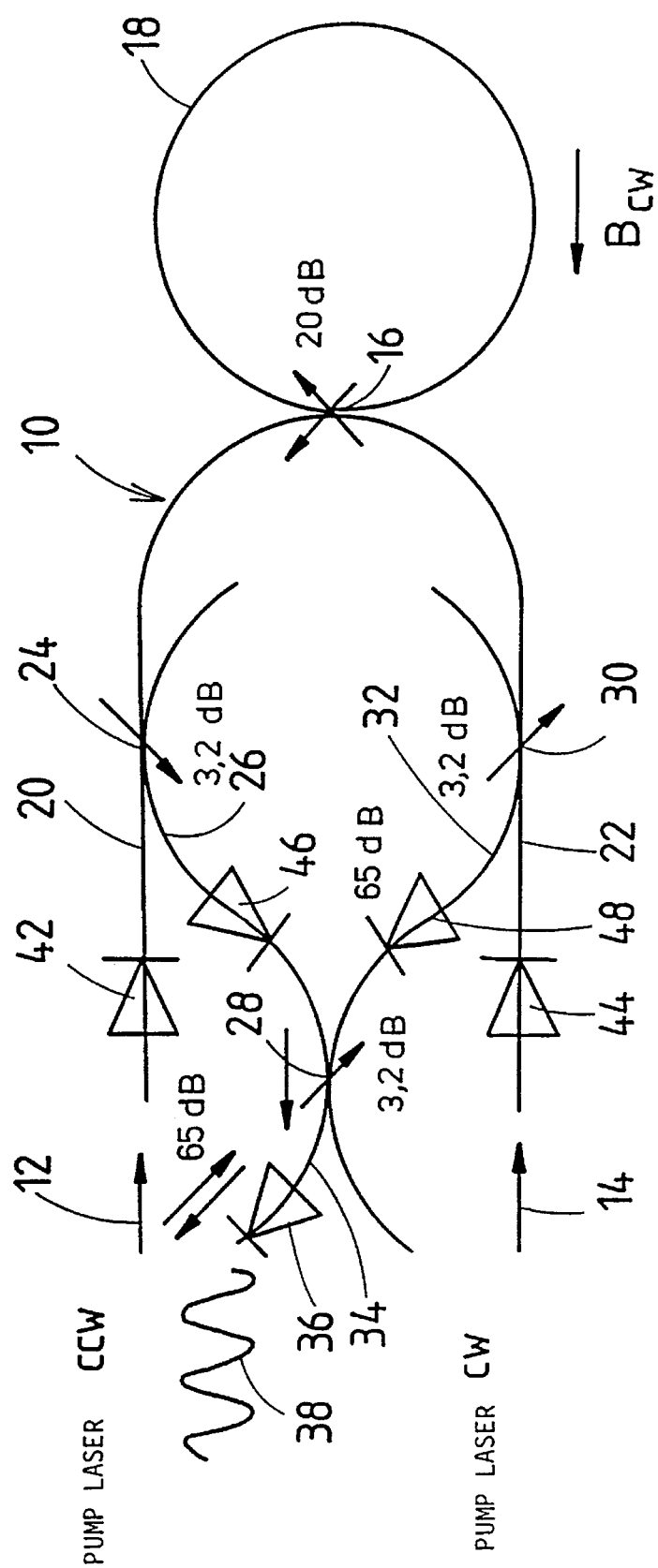
FIG. 2 schematically illustrates a Brillouin ring laser gyro, wherein, in order to damp feedback components originating outside the fiber ring resonator, optical isolators are provided in the pump laser supply fibers, and further optical isolators are provided in the supply fibers of the superposition directional coupler.

FIG. 2 illustrates an embodiment of the invention, wherein said means for damping feedback components comprise optical isolators having high-transmission and low-transmission directions of light passage, one of said optical isolators being arranged in each of said directional coupler supply fibers of said superposition directional coupler, the high-transmission directions of said optical isolators being towards said superposition directional coupler.

The basic structure of the Brillouin ring laser gyro of FIG. 2 is similar to the Brillouin ring laser gyro of FIG. 1. Corresponding elements bear the same reference numerals in both Figures.

In the embodiment of FIG. 2, there is no phase modulator 40. Instead, optical isolators 46 and 48 are provided in the two directional coupler supply fibers 26 and 32, respectively, leading to the superposition directional coupler 28. The optical isolators 46 and 48 permit passage of light towards the superposition directional coupler 28 but have high back-flux damping of, for example, 65 dB.

The Brillouin ring laser, in general, should comprise means for minimizing the proportion of the Brillouin ring laser light coupled back from the pump laser supply fibers 20 and 22.

The means for minimizing the proportion of the Brillouin ring laser light coupled back from the pump laser supply fibers 20,22 comprise the coupling factor of the coupler means 16 between the pump laser supply fibers 20,22 and the fiber ring resonator 18 being so low, that, with a given pump power in the pump laser supply fibers 20,22 just that pump power required for stable ring laser operation is supplied to the fiber ring resonator.

Figure 3:
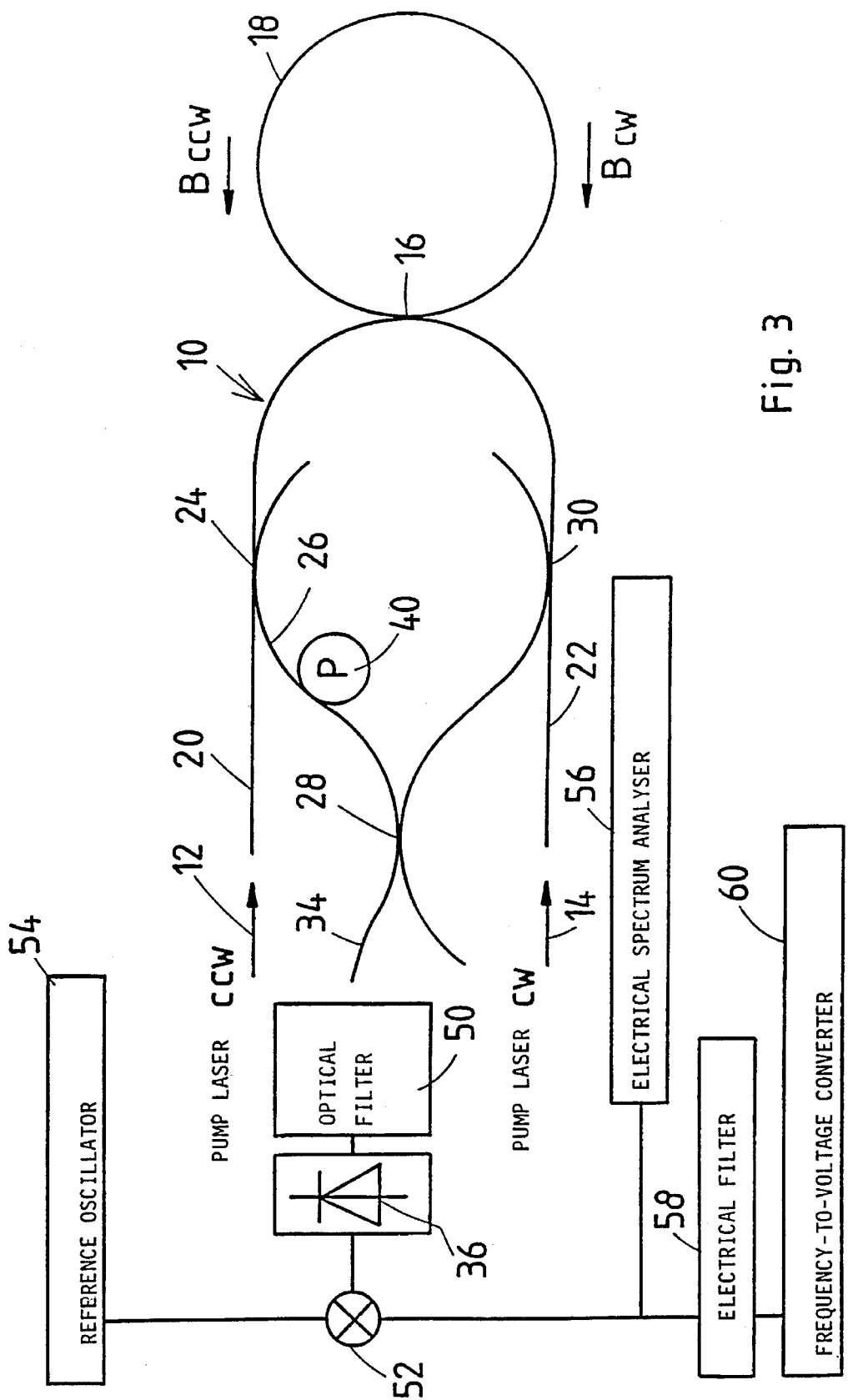
FIG. 3 schematically illustrates an experimental set-up for determining the earth's angular rate using a Brillouin ring laser gyro in the form of a two-color ring laser gyro.

FIG. 3 shows schematically an experimental set-up, by which the effect of damping of the feedback components originating outside the fiber ring resonator can be demonstrated.

The construction of the Brillouin ring laser gyro is substantially identical with that of FIG. 1. Corresponding elements bear the same reference numerals both in FIG. 3 and in FIG. 1. As compared with the Brillouin ring laser gyro of FIG. 1, the optical isolators 42 and 44 are not present in FIG. 3.

An optical filter 50 is interposed between the end of the directional coupler supply fiber 26 and the detector 36. The resulting beat frequency is mixed with the frequency of a reference oscillator 54. The frequency of the reference oscillator 54 lies near 47 Megacycles per second near the free spectral range of th fiber ring resonator 18. Thereby, the output frequency of the mixer 52 is in the range of kilocycles per second. The output signal of the mixer is, once, applied to a spectrum analyser 56. In addition, the output signal of the mixer 52 is filtered by an electrical filter 58 and is converted into a corresponding voltage by a frequency-to-voltage converter.

If the Brillouin ring laser gyro, at first, operates without carrier-suppressed sideband modulation, frequency fluctuations of the beat signal mixed with the frequency of the reference oscillator in the order of magnitude of 100 cycles per second are observed. After the phase modulator has been activated and optimized, the generated sideband spectrum becomes stable. The short-term fluctuations of the frequency are less than one cycle per second.

Figure 4:
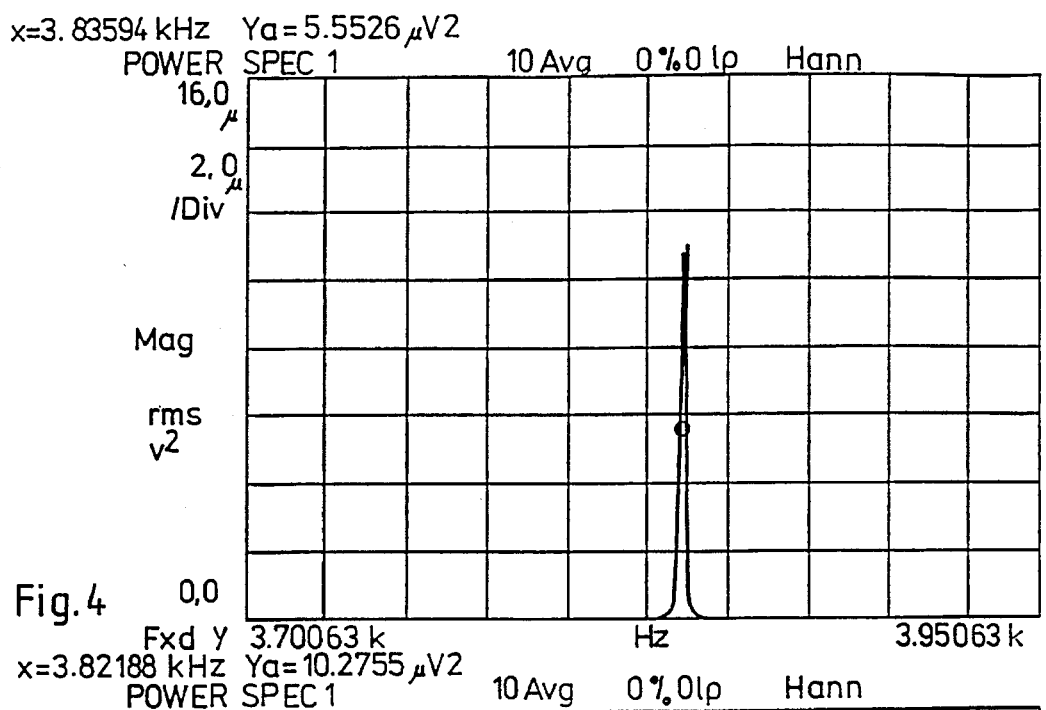
FIG. 4 shows the Fourier spectrum obtained with the experimental set-up of FIG. 3 in the position "North" of the Brillouin ring laser gyro.
Figure 5:
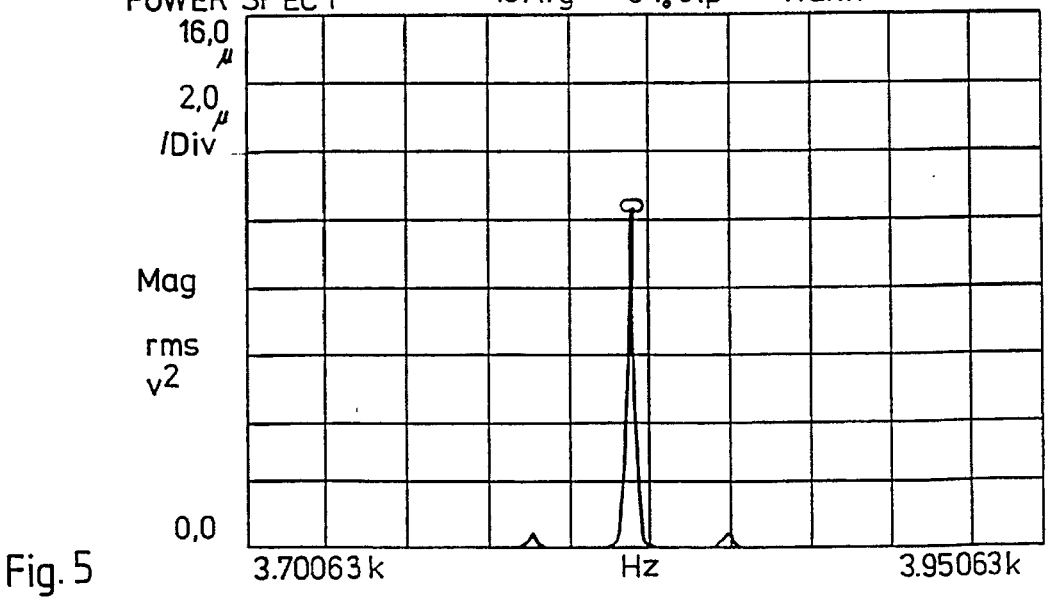
FIG. 5 shows the Fourier spectrum obtained with the experimental set-up of FIG. 3 in the position "South" of the Brillouin ring laser gyro.

FIGS. 4 and 5 show the Fourier spectrum of the output signal of the mixer 52 as provided by the electric spectrum analyser, once with the input axis of the Brillouin ring laser gyro aligned with North (FIG. 4), and once with this input axis aligned with South (FIG. 5). At the measuring site ( Überlingen, Germany), the horizontal component of the earth's angular rate is rather exactly 10°/h. With a scale factor of D/n λ, with D=27 cm, n=1.45 and λ=1.32 μm, this would provide a beat frequency of 6.8 cycles per second, D being the diameter of the fiber ring resonator 18, n being the refractive index of the fiber and λ being the wavelength of the laser wave. The frequency difference resulting from FIGS. 4 and 5 of 14 cycles per second is, as expected, twice the frequency corresponding to the horizontal component of the earth's angular rate.

Figure 6:
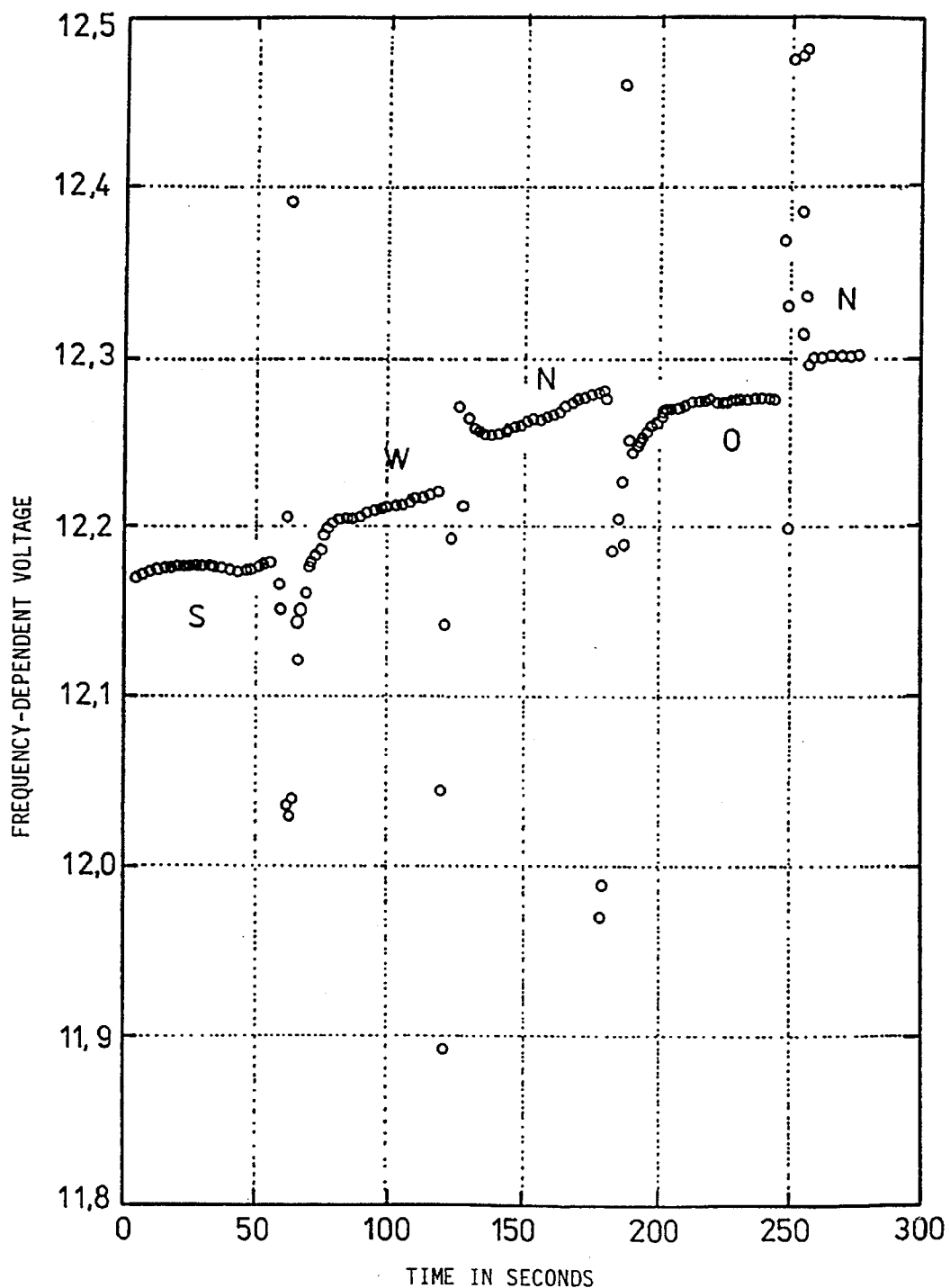
FIG. 6 shows a frequency-analog representation of the signals of the Brillouin ring laser gyro in the experimental set-up of FIG. 3 with the sequence of positions South⇒West ⇒North⇒East⇒.

In accordance with FIG. 6, the input axis of the Brillouin ring laser gyro of FIG. 3, which is normal to the plane of the fiber ring resonator 18, is consecutively moved into the South position, into the West position, into the North position, into the East position and again into the North position. FIG. 6 illustrates, as a function of time, the frequency-dependent voltages provided by the frequency-to-voltage converter 60. Apart from transient states, there are substantially straight waveforms mutually offset in ordinate direction. The offsets of the waveforms obtained with the gyro aligned with North and South relative to the signal waveforms obtained with the gyro aligned with East and West are substantially equal to the theoretical values. A drift is superimposed to the signal waveforms. This drift is, among others, due to changes in temperature. The refractive index and the length of the fiber ring resonator 18 are functions of temperature.

What I claim is:

1. A Brillouin ring laser gyro comprising
   (a) a fiber ring resonator (18), which has a sequence of resonance frequencies, neighboring resonance frequencies differing by a free spectral range,
   (b) means for generating two pump laser waves propagating in said fiber ring resonator (18) in opposite directions, the frequencies of said pump laser waves coinciding with resonance frequencies of said fiber ring resonator (18) and differing by an integral multiple of said free spectral range, whereby two opposite-direction Brillouin ring lasers of different frequencies are excited in said fiber ring resonator (18) by stimulated Brillouin scattering, and
   (c) means (40;42,44;46,48) for damping feedback components of waves originating outside said fiber ring resonator and fed back into said fiber ring resonator.

2. A Brillouin ring laser gyro as claimed in claim 1, wherein
   said means for generating two pump laser waves propagating in said fiber ring resonator (18) in opposite directions comprise two pump lasers (12,14) and means for coupling pump laser waves into said fiber ring resonator,
   said means for coupling pump laser waves into said fiber ring resonator comprising pump laser supply fibers (20,22) arranged to receive and guide said pump laser waves in forward directions and coupler means (16) for coupling said supply fibers (20,22) fiber ring resonator (18), and a separate wave guide network including a superposition directional coupler (28) with two directional coupler supply fibers (26,32), said directional coupler supply fibers being coupled, through branching means (24,30), with said pump laser supply fibers (20,22) for superposing laser light beams from the Brillouin ring laser waves propagating in said fiber ring resonator (18) in opposite directions, said laser light beams being coupled out into said pump laser supply fibers (20,22) through said coupler means (16) and propagating in said pump laser supply fibers in return directions opposite said forward directions.

3. A Brillouin ring laser gyro as claimed in claim 2, wherein said wave guide network for superposing said coupled-out laser light beams comprises a phase modulator (40) in exactly one directional coupler supply fiber (26) of said superposition directional coupler (28), said phase modulator being modulated to provide phase modulation with suppressed carrier and high back-flux damping in the direction towards the fiber ring resonator.

4. A Brillouin ring laser gyro as claimed in claim 2, wherein said means for damping feedback components comprise optical isolators (46,48) having high-transmission and low-transmission directions of light passage, one of said optical isolators (46,48) being arranged in each of said directional coupler supply fibers (26,32) of said superposition directional coupler (28), the high-transmission directions of said optical isolators being towards said superposition directional coupler.

5. A Brillouin ring laser gyro as claimed in claim 3, said means for damping feedback components comprise optical isolators (46,48) having high-transmission and low-transmission directions of light passage, one of said optical isolators (46,48) being arranged in each of said directional coupler supply fibers (26,32) of said superposition directional coupler (28), the high-transmission directions of said optical isolators being towards said superposition directional coupler.

6. A Brillouin ring laser as claimed in claim 4 and further comprising means for minimizing the proportion of the Brillouin ring laser light coupled back from the pump laser supply fibers.

7. A Brillouin ring laser as claimed in claim 6, wherein said means for minimizing the proportion of the Brillouin ring laser light coupled back from the pump laser supply fibers (20,22) comprises the coupling factor of said coupler means (16) between said pump laser supply fibers (20,22) and said fiber ring resonator (18) being so low, that, with a given pump power in said pump laser supply fibers (20,22) just that pump power required for stable ring laser operation is supplied to the fiber ring resonator.

8. A Brillouin ring laser gyro as claimed in claim 6, wherein said means for minimizing the proportion of the Brillouin ring laser light coupled back from the pump laser supply fibers (20,22) comprises optical isolators (42,44) arranged in said pump laser supply fibers (20,22) having high transmission and low-transmission directions of passage, the high transmission directions of passage being towards said fiber ring resonator (18). said optical isolators having high back-flux damping in their low-transmission directions.

9. A Brillouin ring laser gyro as claimed in claim 6, wherein said said means for minimizing the proportion of the Brillouin ring laser light coupled back from the pump laser supply fibers (20,22) comprises means for minimizing back-scattering.

10. A Brillouin ring laser gyro as claimed in claim 2, wherein said pump laser supply fibers (20,22) are formed by ends of one single fiber (10), which extends from one pump laser (12) to the other pump laser (14), said single fiber (10), in a median portion thereof, being coupled with said fiber ring resonator (18) through a coupler representing said coupler means (16).

* * * * *